US009944377B2

(12) United States Patent
Davidson et al.

(10) Patent No.: US 9,944,377 B2
(45) Date of Patent: Apr. 17, 2018

(54) ELECTRIC ACTUATOR FOR A MARINE STEERING SYSTEM

(71) Applicant: Marine Canada Acquisition Inc., Richmond (CA)

(72) Inventors: Noam Dean Davidson, Vancouver (CA); Ray Tat Lung Wong, Richmond (CA); Mark Isaac Dyck, Delta (CA)

(73) Assignee: Marine Canada Acquisition Inc., Richmond (CA)

( * ) Notice: Subject to any disclaimer, the term of this patent is extended or adjusted under 35 U.S.C. 154(b) by 0 days.

(21) Appl. No.: 15/309,175

(22) PCT Filed: Jul. 8, 2015

(86) PCT No.: PCT/CA2015/050636
§ 371 (c)(1),
(2) Date: Nov. 4, 2016

(87) PCT Pub. No.: WO2016/004532
PCT Pub. Date: Jan. 14, 2016

(65) Prior Publication Data
US 2017/0106959 A1    Apr. 20, 2017

Related U.S. Application Data

(60) Provisional application No. 62/021,847, filed on Jul. 8, 2014.

(51) Int. Cl.
*B63H 25/04* (2006.01)
*B63H 25/24* (2006.01)
(Continued)

(52) U.S. Cl.
CPC .......... *B63H 25/24* (2013.01); *F16D 27/004* (2013.01); *F16D 27/112* (2013.01);
(Continued)

(58) Field of Classification Search
CPC ..... B63H 25/24; F16D 27/004; F16D 27/112; F16H 25/2252; H02K 7/06; H02K 7/1023; H02K 7/1085
See application file for complete search history.

(56) References Cited

U.S. PATENT DOCUMENTS 4,974,464 A   12/1990   Erikson et al.
5,461,935 A   10/1995   Hill
(Continued)

FOREIGN PATENT DOCUMENTS

EP   0662573 B1   4/1998
EP   1718885 B1   10/2012
(Continued)

OTHER PUBLICATIONS

WIPO, Canadian International Searching Authority, International Search Report, dated Oct. 9, 2015 in PCT International Application No. PCT/CA2015/050636, 9 pages.
(Continued)

*Primary Examiner* — Stephen P Avila
(74) *Attorney, Agent, or Firm* — Cameron IP (57) ABSTRACT

An electric actuator comprises a housing and an output shaft reciprocatingly received by the housing. There is a screw assembly disposed within the housing and coupled to the output shaft. The screw assembly includes a plurality of annular rollers and a central screw received by the annular rollers. The annular rollers are rotatable about the central screw. There is a motor which includes a stator and a rotor. The rotor has an inner bore which engages the annular rollers. Rotation of the rotor causes the central screw to translate axially relative to the rotor and the output shaft to reciprocate relative to the housing.

31 Claims, 8 Drawing Sheets

(51) Int. Cl.
*H02K 7/06* (2006.01)
*H02K 7/108* (2006.01)
*F16H 25/22* (2006.01)
*F16D 27/00* (2006.01)
*F16D 27/112* (2006.01)
*H02K 7/102* (2006.01)
*H02K 11/215* (2016.01)
*F16H 25/24* (2006.01)
*F16H 25/20* (2006.01)

(52) U.S. Cl.
CPC ........... *F16H 25/2252* (2013.01); *H02K 7/06* (2013.01); *H02K 7/1023* (2013.01); *H02K 7/1085* (2013.01); *B63B 2718/00* (2013.01); *F16H 25/2204* (2013.01); *F16H 2025/2071* (2013.01); *F16H 2025/2078* (2013.01); *F16H 2025/2436* (2013.01); *H02K 11/215* (2016.01)

(56) References Cited

U.S. PATENT DOCUMENTS

| | | | |
|---|---|---|---|
| 5,491,372 A | | 2/1996 | Erhart |
| 5,499,547 A | * | 3/1996 | Nagai ..................... B23Q 1/58 108/143 |
| 5,557,154 A | | 9/1996 | Erhart |
| 5,673,593 A | | 10/1997 | Lafferty |
| 5,720,531 A | * | 2/1998 | Fulks .................. F16H 25/2427 303/115.2 |
| 5,831,360 A | * | 11/1998 | Senjo ..................... H02K 1/185 310/80 |
| 5,910,692 A | | 6/1999 | Saeda et al. |
| 5,942,820 A | * | 8/1999 | Yoshida ............. G11B 19/2009 29/596 |
| 5,975,234 A | | 11/1999 | Bugosh et al. |
| 6,024,422 A | * | 2/2000 | Drennen ................... B60T 8/00 303/115.2 |
| 6,113,444 A | | 9/2000 | Ritger |
| 6,158,295 A | | 12/2000 | Nielsen |
| 6,892,662 B2 | | 5/2005 | Watanabe et al. |
| 7,497,746 B2 | | 3/2009 | Okuyama |
| 7,527,537 B2 | | 5/2009 | Mizutani |
| 7,880,345 B2 | | 2/2011 | Hoffmann et al. |
| 8,015,890 B2 | | 9/2011 | Christensen et al. |
| 8,266,976 B2 | | 9/2012 | Waide |
| 2009/0288511 A1 | | 11/2009 | Kuribayashi et al. |
| 2010/0282009 A1 | | 11/2010 | Knudsen et al. |
| 2012/0137799 A1 | | 6/2012 | Hausberg et al. |
| 2012/0240696 A1 | | 9/2012 | Bastholm et al. |

FOREIGN PATENT DOCUMENTS

| | | |
|---|---|---|
| WO | 2005079134 A2 | 9/2005 |
| WO | 2009086834 A1 | 7/2009 |
| WO | 2013156028 A1 | 10/2013 |

OTHER PUBLICATIONS

WIPO, Canadian International Searching Authority, Written Opinion of the International Searching Authority, dated Oct. 9, 2015 in PCT International Application No. PCT/CA2015/050636, 9 pages.

* cited by examiner

ELECTRIC ACTUATOR FOR A MARINE STEERING SYSTEM

FIELD OF THE INVENTION

The present invention relates to an electric actuator and, in particular, to an electric actuator for a marine steering system.

BACKGROUND OF THE INVENTION

U.S. Application Publication No. 2005/0170713, which was published on Aug. 4, 2005 in the name of Okuyama, discloses an electric actuator for a marine steering system. The electric actuator includes a housing having a shaft in the form of a ball screw extending therethrough. There is a DD (direct drive)-type motor disposed within the housing and mounted about the ball screw. Rotation of the DD-type motor about the ball screw results in the DD-type motor translating axially relative to the ball screw. This in turn results in the housing reciprocating relative to the ball screw. Securing ends of the ball screw to support brackets and coupling the housing to a tiller of a propulsion unit results in steering motion being imparted to the propulsion unit as the housing reciprocates relative to the ball screw.

SUMMARY OF THE INVENTION

It is an object of the present invention to provide an electric actuator for a marine steering system.

There is accordingly provided an electric actuator for a marine steering system which comprises a housing and an output shaft reciprocatingly received by the housing. There is a screw assembly disposed within the housing and coupled to the output shaft. The screw assembly includes a plurality of annular rollers and a central screw received by the annular rollers. The annular rollers are rotatable about the central screw. There is a motor which includes a stator and a rotor. The rotor has an inner bore which engages the annular rollers. Rotation of the rotor causes the central screw to translate axially relative to the rotor and the output shaft to reciprocate relative to the housing.

There is also provided an electric actuator for a marine steering system which comprises a housing and an output shaft reciprocatingly received by the housing. There is a screw assembly disposed within the housing and coupled to the output shaft. The screw assembly includes a nut and a central screw received by the nut. The nut is rotatable about the central screw. There is a motor which includes a stator and a rotor. The rotor has an inner bore which engages the nut. Rotation of the rotor causes the central screw to translate axially relative to the rotor and the output shaft to reciprocate relative to the housing.

There may be an adjustable clutch coupled to the rotor which inhibits rotation of the rotor. The output shaft may be rotatable relative to the rotor to release the clutch.

The clutch may include an electromagnet fixed to the housing and a clutch plate translatable axially relative to the housing. The clutch plate may be preloaded to be spaced-apart from the electromagnet and abutting the rotor. Friction between the clutch plate and the rotor may inhibit relative rotation of the rotor. The clutch may be disengaged by powering the electromagnet to attract the clutch plate towards the electromagnet, creating an air gap between the clutch plate and the rotor, and thereby allowing the rotor to rotate freely.

The clutch may alternatively include a permanent magnet fixed to the housing and a clutch plate translatable axially relative to the housing. The clutch plate may be attracted by the permanent magnet to abut the housing. Friction between the clutch plate and the housing may inhibit relative rotation of the rotor. The clutch may include an electromagnetic coil. The clutch may be disengaged by powering the electromagnetic coil to cancel the force of the permanent magnet, thereby allowing the clutch plate to rotate relative to the housing and the rotor to rotate freely. There may be a spring that biases the clutch plate away from the housing when the electromagnetic coil is powered.

The electric actuator may include end glands which engage the output shaft to minimize any bending load from being transferred to the screw assembly. A cogging torque of the electric actuator may be tuned to slip at a predetermined back-driving force to function as a clutch.

There is further provided a steering system for a marine vessel having a propulsion unit. The steering system comprises an electric actuator for imparting steering movement to the propulsion unit. The electric actuator includes a housing and an output shaft reciprocatingly received by the housing. There is a screw assembly disposed within the housing and coupled to the output shaft. The screw assembly includes a plurality of annular rollers and a central screw received by the annular rollers. The annular rollers are rotatable about the central screw. There is a motor which includes a stator and a rotor. The rotor has an inner bore which engages the annular rollers. Rotation of the rotor causes the central screw to translate axially relative to the rotor and the output shaft to reciprocate relative to the housing.

The propulsion unit may include a tilt tube and a support rod received by the tilt tube. The electric actuator may include support arms which connect respective ends of the output shaft to the support rod of the propulsion unit. The support arms may inhibit axial movement of the output shaft relative to the marine vessel while the housing of the electric actuator reciprocates along the output shaft and linearly relative to the marine vessel.

The propulsion unit may include a tiller and the electric actuator may include a pivot plate pivotably connected to the tiller. The pivot plate may rotationally constrain the housing of the electric actuator to provide reaction torque for rotation of the rotor.

There may be an impact absorber to adjust a stiffness of the electric actuator. The electric actuator may have a longitudinal axis and the impact absorber may be positioned to permit compliance in a direction parallel to the longitudinal axis.

BRIEF DESCRIPTION OF THE DRAWINGS

The invention will be more readily understood from the following description of the embodiments thereof given, by way of example only, with reference to the accompanying drawings, in which.

DESCRIPTION OF THE PREFERRED EMBODIMENTS

Figure 1:
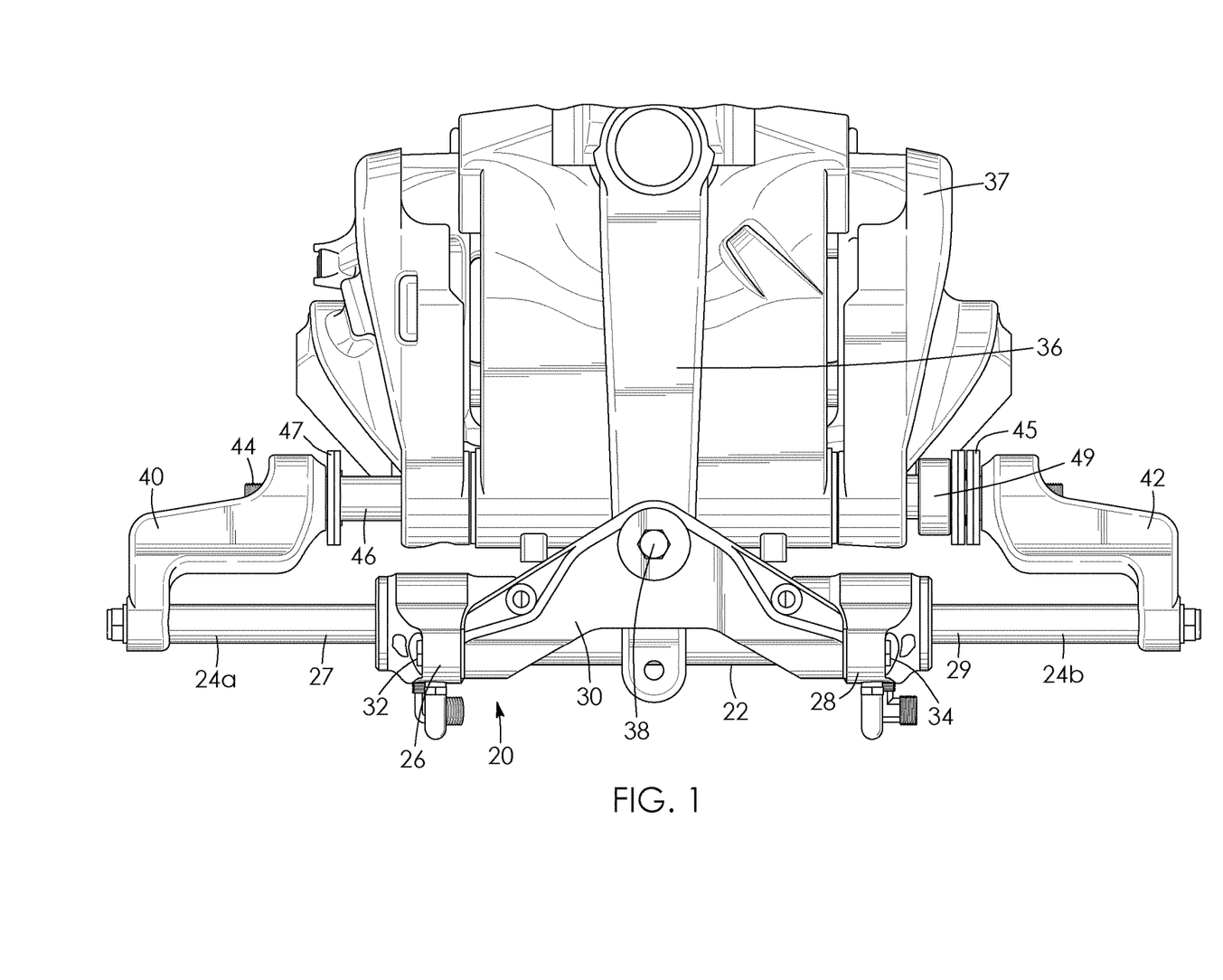
FIG. 1 is a top plan view of a first embodiment of an electric actuator for a marine steering system with the marine steering system shown in fragment.
Figure 2:
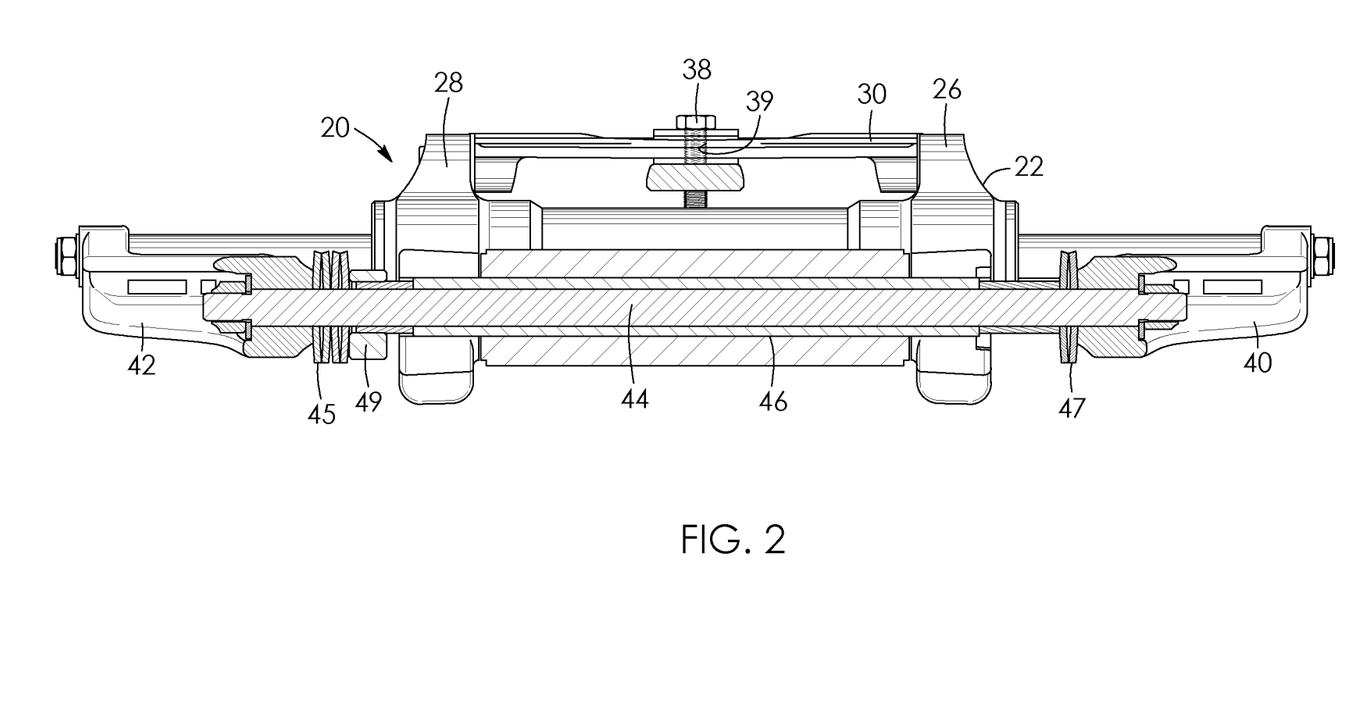
FIG. 2 is a rear elevation view of the first embodiment of the electric actuator.

Referring to the drawings and first to FIGS. 1 and 2, there is shown a first embodiment of an electric actuator 20 for a marine steering system. The electric actuator 20 generally comprises a housing 22 with output shafts 24a and 24b reciprocatingly received therein and spaced-apart housing arms 26 and 28 which extend radially outward of the housing 22. The output shafts 24a and 24b are at least partially threaded in this example. However, respective inner portions 27 and 29 of the output shafts 24a and 24b are smooth so they can be sealed. A pivot plate 30 can be coupled to each of the housing arms 26 and 28 by respective pivot pins 32 and 34. The pivot plate 30 extends between the housing arms 26 and 28 and can pivot about the pivot pins 32 and 34. A steering member or tiller 36 of a propulsion unit 37 can be pivotably connected to the pivot plate 30 by a tiller pin or bolt 38. There may be an impact absorber between the pivot plate 30 and the tiller bolt 38. For example, a slot 39 in the pivot plate 30 which receives the tiller bolt 38 may be lined with a rubber bushing or equivalent.

Support arms 40 and 42 connect respective ends of the output shafts 24a and 24b to a support rod 44 of a tilt tube 46 of the propulsion unit. The support arms 40 and 42 inhibit axial movement of the output shafts 24a and 24b relative to a marine vessel (not shown) while the housing 22 reciprocates along the output shafts and linearly relative to the marine vessel. This relative linear movement of the housing 22 causes the tiller 36 of the propulsion unit to pivot and thereby causes the propulsion unit to be steered in a conventional manner. There may also be impact absorbers 45 and 47 mounted on the support rod 44 of the tilt tube 46. The impact absorbers can be mounted between the pivot plate 30 and housing arms 26 and 28 or between the output shaft 24a and the support arm 40 and between the output shaft 24b and the support arm 42. In general, the impact absorbers may be mounted in positions that permit compliance in a direction parallel to a longitudinal axis of the electric actuator. The impact absorbers 45 and 47 together with an adjuster nut 49 may be used to adjust a stiffness of the electric actuator 20. In this example, the impact absorbers 45 and 47 are spring washers but may be rubber grommets or any other suitable compressible material. The support arms 40 and 42 provide rotational constraint to the output shafts 24a and 24b. Alternatively, this constraint could be achieved by other means such as a pin. The pivot plate 30 attached to the tiller 36 provides rotational constraint on the housing 22. This provides reaction torque for the rotation of the motor.

Figure 3:
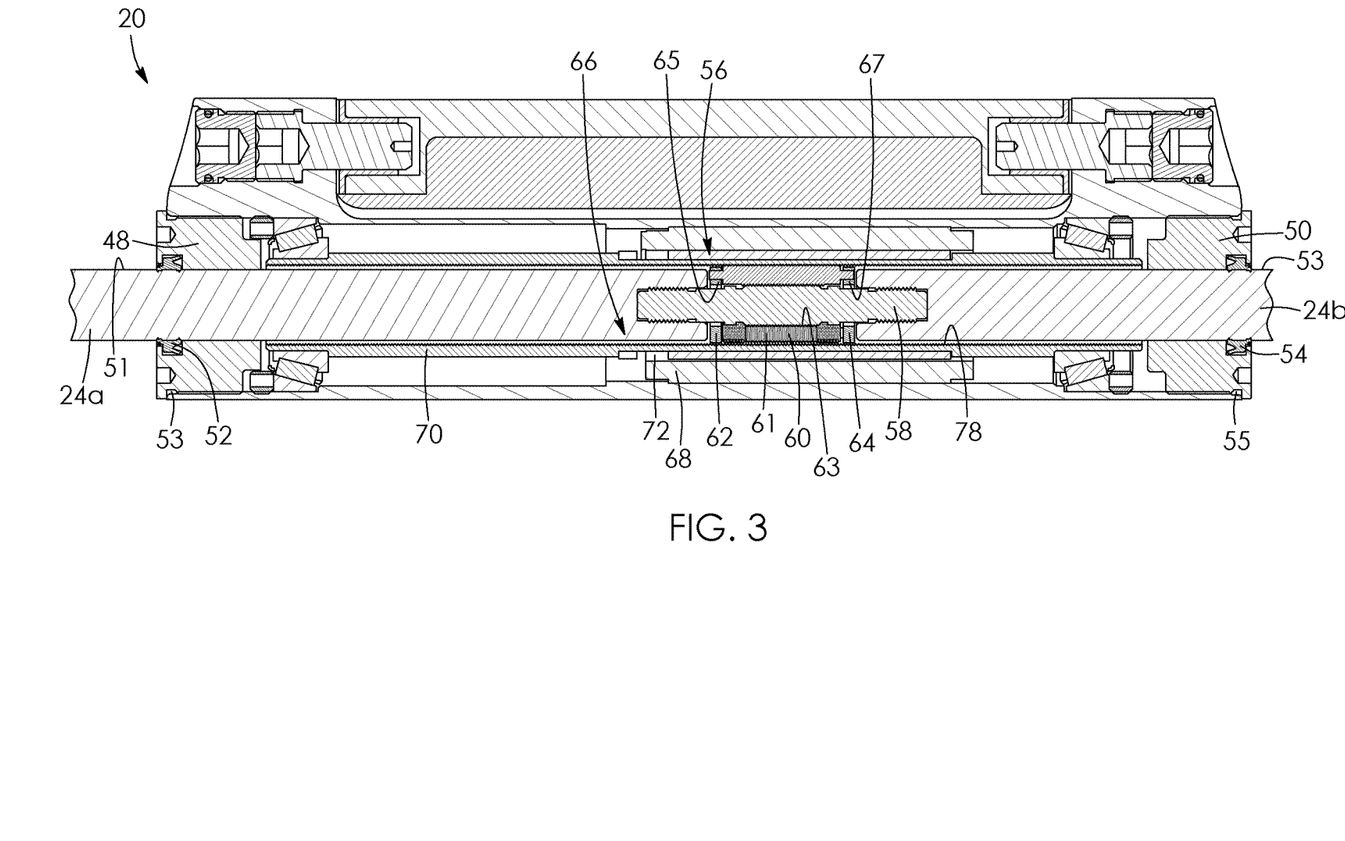
FIG. 3 is a sectional view of the first embodiment of the electric actuator.

The electric actuator 20 is shown in greater detail in FIG. 3. The output shafts 24a and 24b are reciprocatingly received by the housing 22 and are coupled by a roller screw assembly 56. End glands 48 and 50 are each provided with respective seals 52 and 54 which seal against corresponding smooth surfaces 51 and 53 of the output shafts 24a and 24b and seal the housing 22. There are O-rings 53 and 55 which seal between the glands and the housing. The end glands 48 and 50 act as bushings with a tight clearance fit on the output shafts 24a and 24b and function to minimize any bending load or deflection from being transferred to the roller screw assembly 56. The roller screw assembly 56 has a central screw 58 which is received by a plurality of annular rollers 60. The rollers 60 are able to rotate about the central screw 58 in a planetary fashion but do not translate axially relative to the central screw 58. Alignment of the rollers 60 and the central screw 58 is maintained through the use of interlocking gear teeth 61 and 63 on both the rollers 60 and the central screw 58. There are annular end plates 62 and 64 which hold the roller screw assembly 56 together. The end plates 62 and 64 are free to rotate relative to the central screw 58 and the end plates 62 and 64 are each provided with journal bearing bores 65 and 67 that allow the rollers 60 to rotate independently of the end plates 62 and 64. The end plates 62 and 64 are axially constrained by the annular rollers 60 and the output shafts 24a and 24b. Alternatively, the output shafts 24a and 24b and the central screw 58 can be made as one piece.

The rollers 60 are rotated by a motor assembly 66 which, in this example, is a hollow DC motor including a stator 68 having electrical windings, a rotor 70 having magnets, and a Hall Effect sensor board 72. The electrical windings are rigidly attached or timed directly to the housing 22. The magnets are bonded directly to the rotor 70 which is constrained axially within the housing 22 but is able to rotate through the provision of bearings 74 and 76 disposed at opposite ends of the rotor 70. The Hall Effect sensor board 72 is bonded or timed directly to the stator 68 and sequences electrical power to the electrical windings of the stator depending on a relative position of the rotor 70. The rotor 70 has a threaded inner bore 78 which threadedly engages the rollers 60. Rotation of the rotor 70 relative to the roller screw assembly 56 causes the output shafts 24a and 24b to reciprocate relative to the housing 22. When axial movement of the output shafts 24a and 24b is inhibited, for example by support arms in a marine steering system, the result is relative reciprocation of the housing 22 along the output shafts 24a and 24b which imparts steering motion to a propulsion unit. Cogging torque of the electric actuator may be tuned to slip at a predetermined back-driving force to function as a brake or clutch.

Stroke length of the output shafts 24a and 24b is maximized by having the central screw 58 translate axially relative to the rotor 70 as compared to conventional electric actuators in which a rotor or nut translates axially relative to a screw. The maximized stroke length allows the electric actuator to have a smaller envelope and fit within the geometric constraints of a marine steering system. With this arrangement, the total length of the electric actuator relative to its stroke length ratio can be less than three for a balanced, sealed cylinder with smooth shafts.

Figure 4:
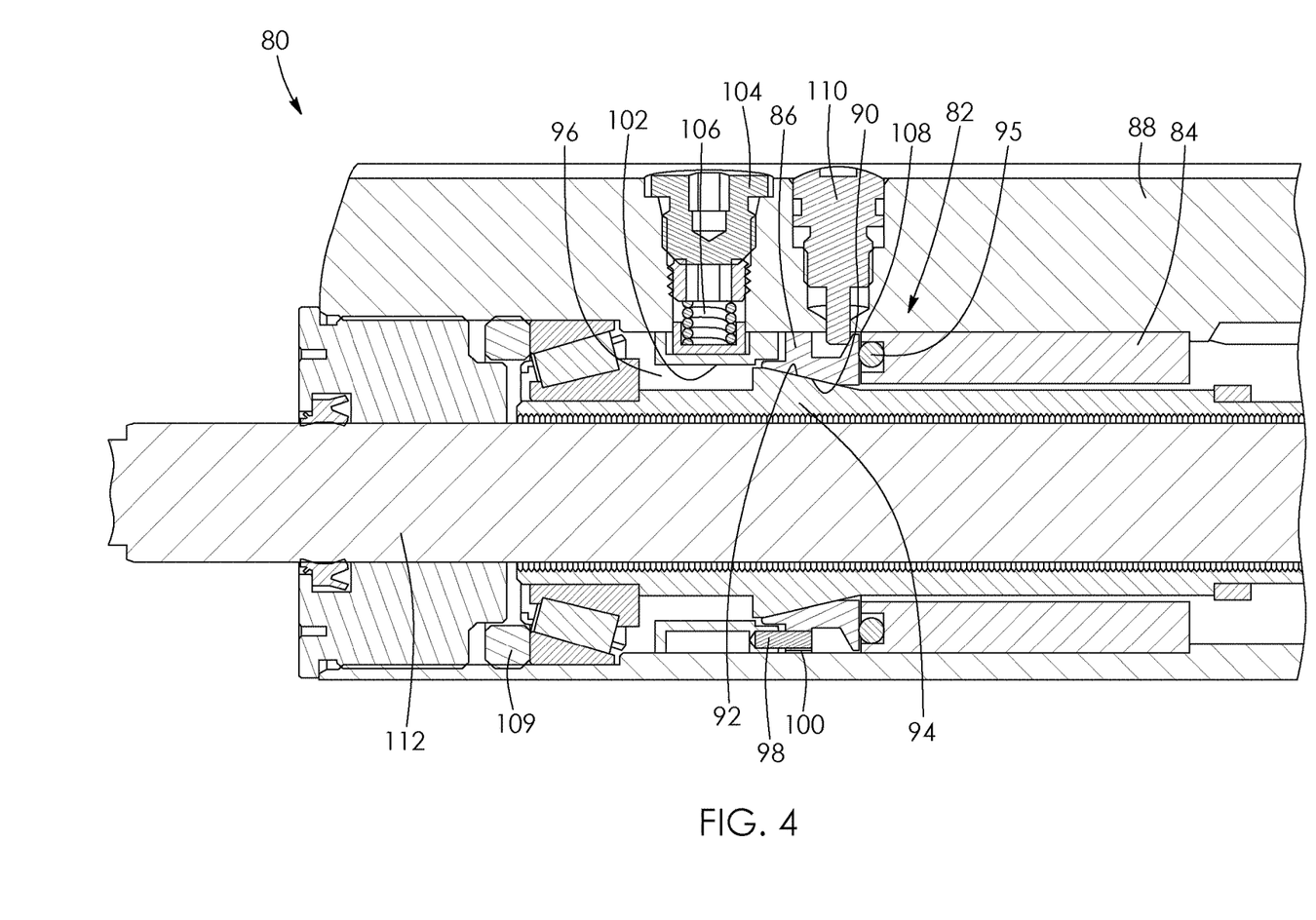
FIG. 4 is a fragmentary, sectional view of a second embodiment of an electric actuator for a marine steering system.

A second embodiment of an electric actuator 80 for a marine steering system is shown in FIG. 4. The second embodiment of the electric actuator 80 is generally similar to the first embodiment of the electric actuator 20 with the exception that the second embodiment of the electric actuator 80 is further provided with a brake or clutch 82 including an electromagnet 84 and a clutch plate 86 made of ferrous material. The electromagnet 84 is fixed to a housing 88 of the electric actuator 80. The clutch plate 86 is able to translate axially relative to the housing 88. The clutch plate 86 has a tapered surface 90 which abuts a corresponding tapered surface 92 of a rotor 94 of the electric actuator 80. The clutch plate 86 is preloaded to be spaced apart from the electromagnet 84 and abutting the tapered surface 92 of the rotor 94. Preloading is accomplished using an O-ring 95 in this example but any suitable nonferrous deformable material such as a stainless steel spring may be used. Friction between the tapered surface 90 of the clutch plate 86 and the tapered surface 92 of the rotor 94 inhibits relative rotation of the rotor 94 when the clutch plate 86 is preloaded. The clutch 82 is disengaged by powering the electromagnet 84 which then attracts the clutch plate 86 to create an air gap between the clutch plate 86 and the rotor 94 and thereby allow the rotor to rotate freely.

A slip plate 96 is used to inhibit relative rotation of the clutch plate 86. The slip plate 96 is coupled to the clutch plate 86 by dowel pins, for example dowel pin 98, which are in the slip plate 96 about its circumference. Apertures, for example aperture 100, about a circumference of the clutch plate 86 slidingly receive the dowel pins and allow the clutch plate 86 to move axially relative to the slip plate 96 as the clutch 82 is disengaged or released. Relative rotation of the slip plate 96 is inhibited by a friction shoe 102 that frictionally engages the slip plate 96. An externally adjustable preload screw 104 and spring 106 allow for friction at the slip plate 96 to be adjusted. When in use, at back-driving forces below a threshold, torque is resisted by the frictional engagement of the friction shoe 102 and the slip plate 96. At back-driving forces that exceed the threshold, the slip plate 96, the clutch plate 86, and the rotor 94 all rotate relative to the friction shoe 102.

There is an air gap 108 between the electromagnet 84 and the clutch plate 86 when the clutch 82 is disengaged as shown in FIG. 4. The air gap 108 determines the required strength and corresponding size of the electromagnet. Due to manufacturing tolerances, it can be difficult to attain repeatable air gaps and, as a result, oversized electromagnets may be required. However, the air gap 108 may be adjusted using a retaining nut 109 shown in FIG. 4. This allows the air gap 108 to be set upon assembly by positioning the rotor 94 relative to the clutch 82 and thereby reduce tolerance stack-up concerns. There is also a manual bypass mechanism which can release the clutch 82 to allow an operator to manually reposition the electric actuator 80. A manual bypass screw 110 moves the clutch plate 86 away from the rotor 94 when screwed into the electric actuator 80. This allows the rotor 94 to rotate freely and the electric actuator 80 to be back-driven and manually repositioned. In a marine steering system, the manual bypass mechanism may further include removable pins on the support brackets which would allow an output shaft 112 of the electric actuator 80 to be rotated relative to the rotor 94, resulting in relative axial translation of the output shaft 112. Alternatively, the manual bypass mechanism may include nuts on ends of the output shaft 112 which would allow the output shaft to be rotated relative to the rotor 94. However, rotational constraint of the output shaft 112 may not be required.

Figure 5:
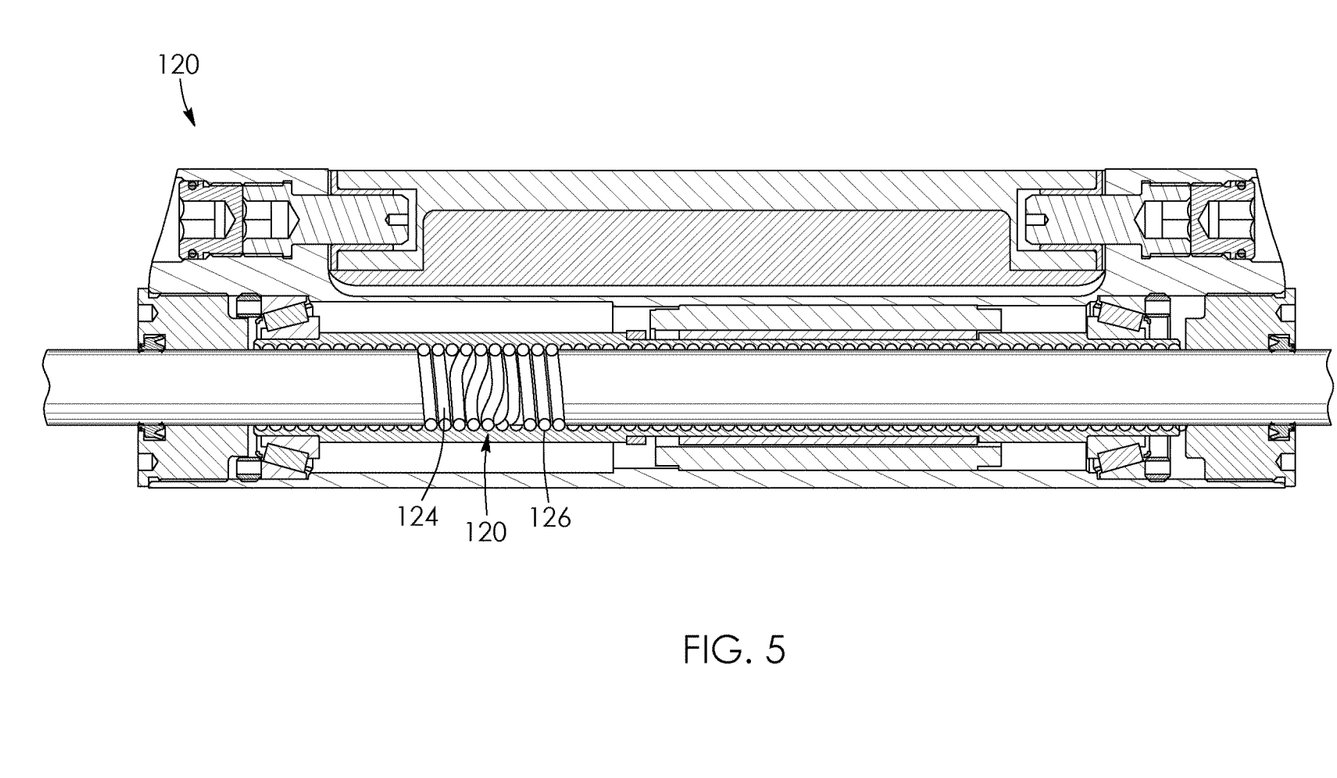
FIG. 5 is a sectional view of a third embodiment of an electric actuator for a marine steering system.

A third embodiment of an electric actuator 120 for a marine steering system is shown in FIG. 5. The third embodiment of the electric actuator 120 is generally similar to the first embodiment of the electric actuator 20 with the exception that the third embodiment of the electric actuator 120 is provided with a ball screw assembly 122 in place of the roller screw assembly. The ball screw assembly 122 includes a ball screw 124 and a nut 126.

Figure 6:
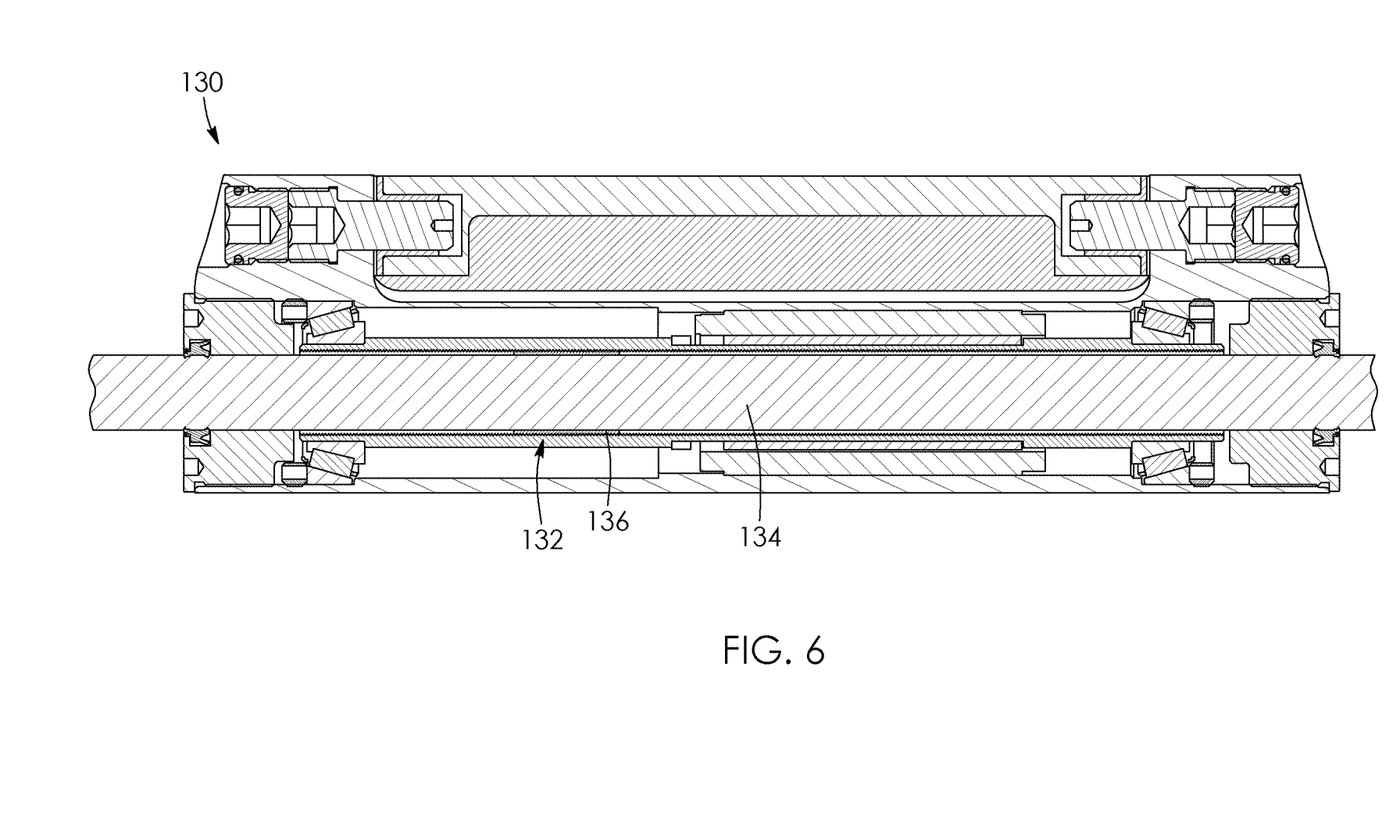
FIG. 6 is a sectional view of a fourth embodiment of an electric actuator for a marine steering system.

A fourth embodiment of an electric actuator 130 for a marine steering system is shown in FIG. 6. The fourth embodiment of the electric actuator 130 is generally similar to the first embodiment of the electric actuator 20 with the exception that the fourth embodiment of the electric actuator 130 is provided with a standard screw assembly 132 in place of the roller screw assembly. The standard screw assembly 132 includes a standard screw 134 and a nut 136.

Figure 7:
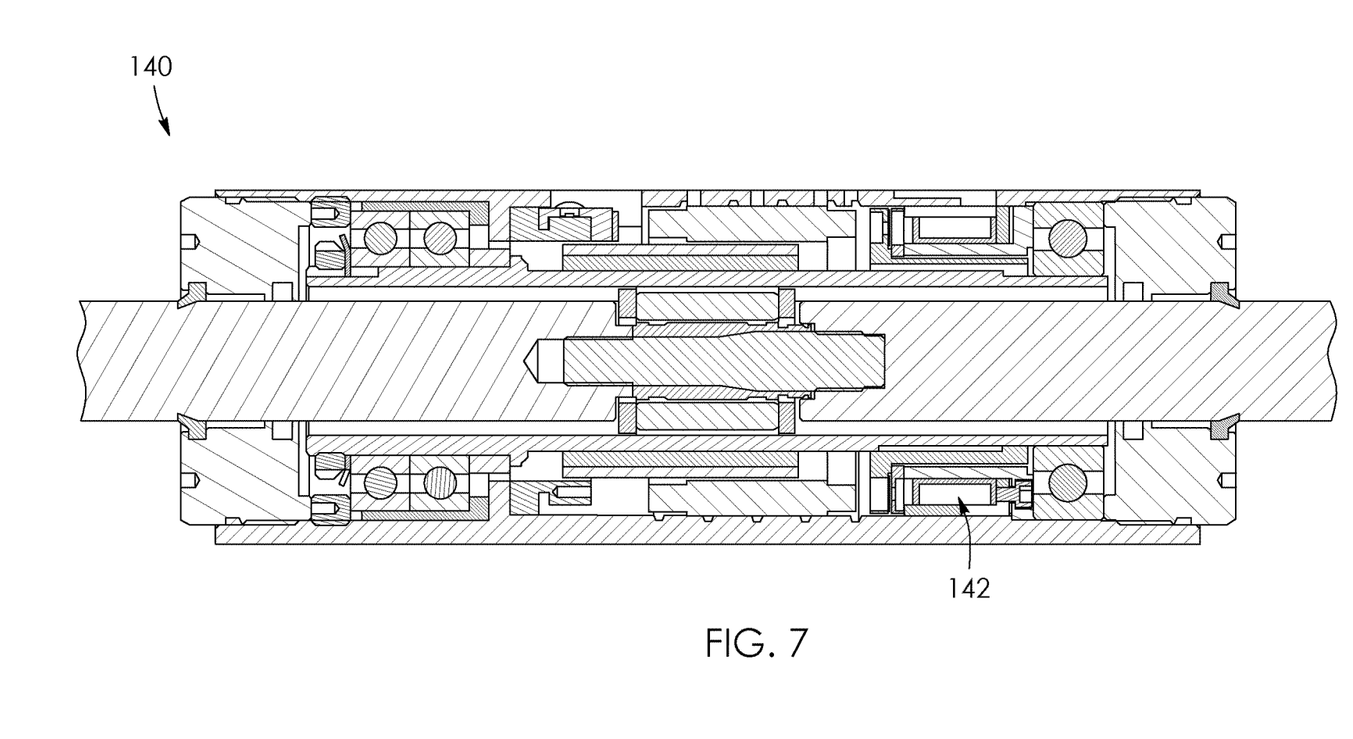
FIG. 7 is a sectional view of a fifth embodiment of an electric actuator for a marine steering system.
Figure 8:
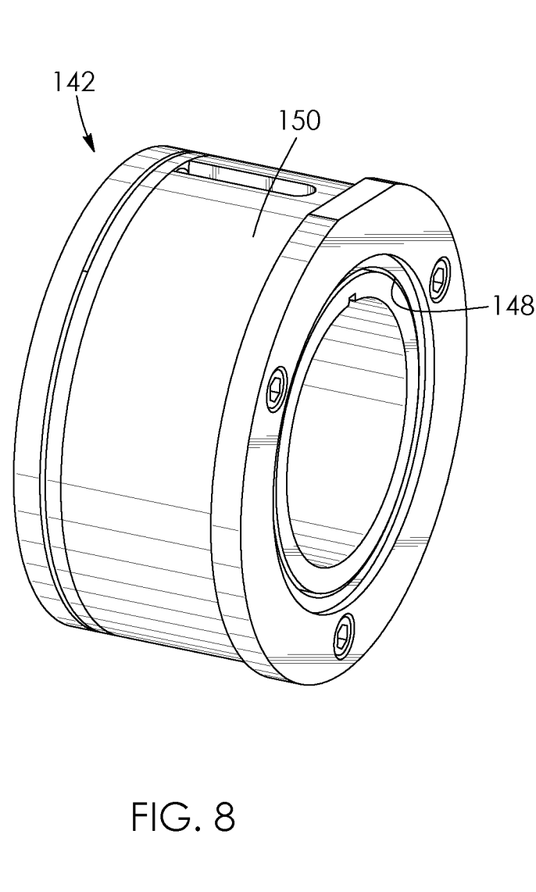
FIG. 8 is a perspective view of a brake assembly of the fifth embodiment of the electric actuator.
Figure 9:
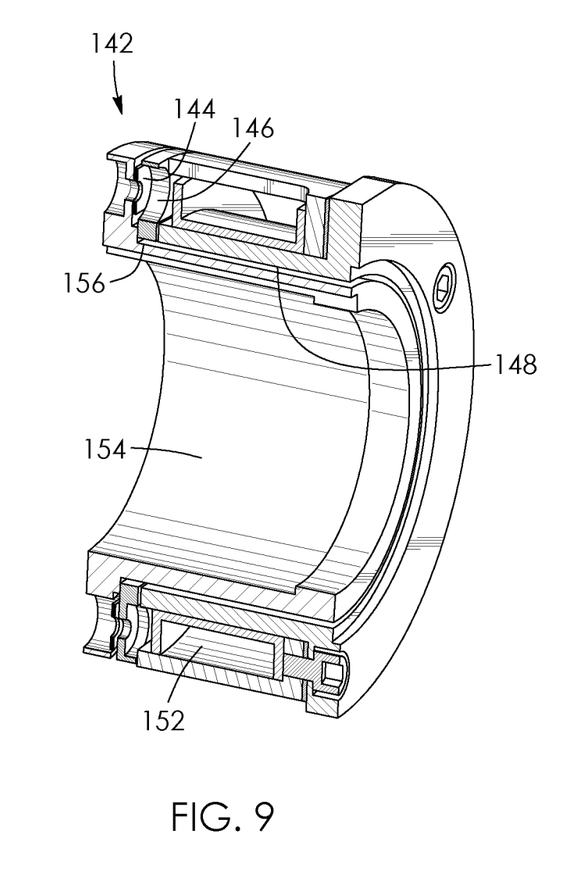
FIG. 9 is a sectional view of the brake assembly of FIG. 8.

A fifth embodiment of an electric actuator 140 for a marine steering system is shown in FIG. 7. The fifth embodiment of the electric actuator 140 is generally similar to the first embodiment of the electric actuator 20 with the exception that the fifth embodiment of the electric actuator 140 is provided with a brake or clutch 142 which is shown in greater detail in FIGS. 8 and 9. The clutch 142 is an electromagnetic clutch and includes a permanent magnet 144. In the unpowered state, magnetic fields from the permanent magnet 144 attract a clutch plate 146 towards an inner face 148 of a housing 150 of the clutch 142. Friction between the clutch plate 146 and the housing 150 inhibits relative rotation of the clutch plate when the clutch 142 is in the unpowered state. Powering an electromagnetic coil 152 in the clutch 142 creates a magnetic field that cancels the force of the permanent magnet 144, allowing the clutch plate 146 to rotate relative to the housing 150. The clutch plate 146 is connected to a hub 154 via springs, for example, spring 156, which provide axial movement relative to one another. The spring 156 biases the clutch plate 146 away from the inner face 148 of the housing 150 when the clutch 142 is powered. The hub 154 is rotationally constrained to the rotor. When the clutch 142 is powered, the rotor is able to rotate freely. When the clutch 142 is unpowered, a braking torque is applied to prevent the rotor from rotating.

It will be understood by a person skilled in the art that many of the details provided above are by way of example only, and are not intended to limit the scope of the invention which is to be determined with reference to the following claims.

What is claimed is:

1. An electric actuator for a marine steering system, the electric actuator comprising:
   a housing;
   an output shaft reciprocatingly received by the housing;
   a screw assembly disposed within the housing and coupled to the output shaft, the screw assembly including a plurality of annular rollers and a central screw received by the annular rollers, the annular rollers being rotatable about the central screw; and
   a motor including a stator and a rotor, the rotor having an inner bore which engages the annular rollers, wherein rotation of the rotor causes the central screw to translate axially relative to the rotor and the output shaft to reciprocate relative to the housing.

2. The electric actuator as claimed in claim 1 further including an adjustable clutch coupled to the rotor which inhibits rotation of the rotor.

3. The electric actuator as claimed in claim 2 wherein the clutch includes an electromagnet fixed to the housing and a clutch plate translatable axially relative to the housing, the clutch plate being preloaded to be spaced-apart from the electromagnet and abutting the rotor, wherein friction between the clutch plate and the rotor inhibits relative rotation of the rotor.

4. The electric actuator as claimed in claim 3 wherein the clutch is disengaged by powering the electromagnet to attract the clutch plate towards the electromagnet, creating an air gap between the clutch plate and the rotor, and thereby allowing the rotor to rotate freely.

5. The electric actuator as claimed in claim 2 wherein the clutch includes a permanent magnet fixed to the housing and a clutch plate translatable axially relative to the housing, the clutch plate being attracted by the permanent magnet to abut the housing, wherein friction between the clutch plate and the housing inhibits relative rotation of the rotor.

6. The electric actuator as claimed in claim 5 wherein the clutch includes an electromagnetic coil and wherein the clutch is disengaged by powering the electromagnetic coil to cancel the force of the permanent magnet, thereby allowing the clutch plate to rotate relative to the housing and the rotor to rotate freely.

7. The electric actuator as claimed in claim 6 further including a spring that biases the clutch plate away from the housing when the electromagnetic coil is powered.

8. The electric actuator as claimed in claim 1 further including end glands which engage the output shaft to minimize any bending load from being transferred to the screw assembly.

9. The electric actuator as claimed in claim 1 wherein a cogging torque of the electric actuator is tuned to slip at a predetermined back-driving force to function as a clutch.

10. A steering system for a marine vessel having a propulsion unit, the steering system comprising:
   an electric actuator for imparting steering movement to the propulsion unit, the electric actuator including:
      a housing;
      an output shaft reciprocatingly received by the housing;
      a screw assembly disposed within the housing and coupled to the output shaft, the screw assembly including a plurality of annular rollers and a central screw received by the annular rollers, the annular rollers being rotatable about the central screw; and
      a motor including a stator and a rotor, the rotor having an inner bore which engages the annular rollers, wherein rotation of the rotor causes the central screw to translate axially relative to the rotor and the output shaft to reciprocate relative to the housing.

11. The steering system as claimed in claim 10 wherein the propulsion unit includes a tilt tube and a support rod received by the tilt tube, and the electric actuator includes support arms which connect respective ends of the output shaft to the support rod of the propulsion unit, the support arms inhibiting axial movement of the output shaft relative to the marine vessel while the housing of the electric actuator reciprocates along the output shaft and linearly relative to the marine vessel.

12. The steering system as claimed in claim 10 wherein the propulsion unit includes a tiller and the electric actuator includes a pivot plate pivotably connected to the tiller, the pivot plate rotationally constraining the housing of the electric actuator to provide reaction torque for rotation of the rotor.

13. The steering system as claimed in claim 10 further including an impact absorber to adjust a stiffness of the electric actuator.

14. The steering system as claimed in claim 13 wherein the electric actuator has a longitudinal axis and the impact absorber is positioned to permit compliance in a direction parallel to the longitudinal axis.

15. The electric actuator as claimed in claim 1 further including bushings which engage the output shaft to minimize any bending load from being transferred to the screw assembly.

16. A steering system for a marine vessel, the steering system comprising:
   a propulsion unit including a tilt tube, a support rod received by the tilt tube, and a tiller; and
   an electric actuator for imparting steering movement to the propulsion unit, the electric actuator including:
      a housing;
      an output shaft reciprocatingly received by the housing, the output shaft being partially threaded and having smooth surfaces;
      a motor disposed within the housing, the motor including a stator and a rotor, rotation of the rotor causing the output shaft to translate axially relative to the rotor and causing the output shaft to reciprocate relative to the housing;
      a pivot plate pivotably connected to the tiller of the propulsion unit, the pivot plate rotationally constraining the housing of the electric actuator to provide reaction torque for rotation of the rotor; and
      support arms which connect respective ends of the output shaft to the support rod of the propulsion unit, the support arms providing rotational constraint to the output shaft and the support arms inhibiting axial movement of the output shaft relative to the marine vessel while the housing of the electric actuator reciprocates linearly along the output shaft.

17. The steering system as claimed in claim 16 wherein the output shaft is manually rotatable relative to the rotor.

18. The steering system as claimed in claim 16 wherein a cogging torque of the electric actuator is tuned to slip at a predetermined back-driving force to function as a clutch.

19. The steering system as claimed in claim 18 wherein the output shaft is manually rotatable relative to the rotor when the cogging torque inhibits rotation of the rotor.

20. The steering system as claimed in claim 16 further including an adjustable clutch coupled to the rotor which inhibits rotation of the rotor.

21. The steering system as claimed in claim 20 wherein the output shaft is manually rotatable relative to the rotor when the clutch inhibits rotation of the rotor.

22. The steering system as claimed in claim 20 wherein the clutch includes an electromagnet fixed to the housing and a clutch plate translatable axially relative to the housing, the clutch plate being preloaded to be spaced-apart from the electromagnet and abutting the rotor, wherein friction between the clutch plate and the rotor inhibits relative rotation of the rotor.

23. The steering system as claimed in claim 22 wherein the clutch is disengaged by powering the electromagnet to attract the clutch plate towards the electromagnet, creating an air gap between the clutch plate and the rotor, and thereby allowing the rotor to rotate freely.

24. The steering system as claimed in claim 20 wherein the clutch includes a permanent magnet fixed to the housing and a clutch plate translatable axially relative to the housing, the clutch plate being attracted by the permanent magnet to abut the housing, wherein friction between the clutch plate and the housing inhibits relative rotation of the rotor.

25. The steering system as claimed in claim 24 wherein the clutch includes an electromagnetic coil and wherein the clutch is disengaged by powering the electromagnetic coil to cancel the force of the permanent magnet, thereby allowing the clutch plate to rotate relative to the housing and the rotor to rotate freely.

26. The steering system as claimed in claim 25 further including a spring that biases the clutch plate away from the housing when the electromagnetic coil is powered.

27. The steering system as claimed in claim 16 further including end glands which engage the smooth surfaces of the output shaft, as the output shaft reciprocates relative to the housing, to minimize any bending load from being transferred to the output shaft.

28. The steering system as claimed in claim 16 further including bushings which engage the smooth surfaces of the output shaft, as the output shaft reciprocates relative to the housing, to minimize any bending load from being transferred to the output shaft.

29. The steering system as claimed in claim 27 wherein a total length of the electric actuator relative to its stroke length ratio is less than three.

30. The steering system as claimed in claim 16 further including an impact absorber to adjust a stiffness of the electric actuator.

31. The steering system as claimed in claim 30 wherein the electric actuator has a longitudinal axis and the impact absorber is positioned to permit compliance in a direction parallel to the longitudinal axis.

* * * * *